(12) United States Patent
Deprun (10) Patent No.: US 7,907,945 B2
(45) Date of Patent: Mar. 15, 2011

(54) APPARATUS AND METHOD OF OPTIMIZING THE SELECTION OF WIRELESS NETWORKS

(75) Inventor: Jean-François Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 676 days.

(21) Appl. No.: 11/847,225

(22) Filed: Aug. 29, 2007

(65) Prior Publication Data
US 2008/0057912 A1 Mar. 6, 2008

(30) Foreign Application Priority Data

Aug. 31, 2006 (EP) .................................... 06291379

(51) Int. Cl.
*H04W 4/00* (2009.01)
(52) U.S. Cl. .................. 455/432.1; 455/435.2; 455/436; 455/439; 455/1; 455/2
(58) Field of Classification Search ............... 455/432.1, 455/435.2, 436, 439
See application file for complete search history.

(56) References Cited

U.S. PATENT DOCUMENTS

| 2004/0205158 A1* | 10/2004 | Hsu ............................. 709/218 |
| 2006/0063560 A1* | 3/2006 | Herle ........................ 455/552.1 |

FOREIGN PATENT DOCUMENTS

| EP | 1638360 A1 | 3/2006 |
| WO | WO 2004/077752 A1 | 9/2004 |

OTHER PUBLICATIONS

Shiao-Le Tsao et al.: "Reducing Idle Mode Power Consumption of Cellular/VoWLAN Dual Mode Mobiles." Global Telecommunications Conference, 2005. Globecom '05. IEEE St. Louis, MO, USA Nov. 28-Dec. 5, 2005, Piscataway, N.J., USA, IEEE, Nov. 28, 2005.

* cited by examiner

*Primary Examiner* — Nick Corsaro
*Assistant Examiner* — Amanuel Lebassi
(74) *Attorney, Agent, or Firm* — Lee, Hong, Degerman, Kang & Waimey (57) ABSTRACT

Methods and a mobile terminal capable of selecting a wireless network, the invention includes when detected to be at or near a first wireless network service area, receiving information related to the first wireless network service area from a second wireless network, activating a first wireless network module based upon the received information and a user setting, detecting a first wireless network with the first wireless network module and the received information, and establishing a connection upon the detecting.

26 Claims, 4 Drawing Sheets

APPARATUS AND METHOD OF OPTIMIZING THE SELECTION OF WIRELESS NETWORKS

CROSS-REFERENCE TO RELATED APPLICATIONS

Pursuant to 35 U.S.C. §119(a), this application claims the benefit of earlier filing date and right of priority to European Patent Application No. 06291379.3, filed on Aug. 31, 2006, the contents of which are hereby incorporated by reference herein in their entirety.

BACKGROUND OF THE INVENTION

1. Field of the Invention

The present invention relates to a wireless communications device. More particularly, the present invention relates to an apparatus and a method of optimizing the power saving in a wireless communications device.

2. Description of Related Art

As more and more current electronic gadgets become mobile, demand for mobile or wireless internet accesses anywhere and anytime increases. Accordingly, wireless internet or intranet accesses may surpass the traditional wired internet access in a very near future. In cities that offer a city-wide free or very cheap wireless internet access, such as a hot spot, the future may have been realized earlier. People with a laptop, personal data aid (PDA) or even a wireless mobile phone can access the internet via a mobile telecommunications networks, wireless local area network (WLAN) access points such as IEEE 802.11 or Bluetooth. Although the mobile telecommunications networks may provide the mobile terminals with a consistent, extensive coverage for the internet access, it may be still more expensive and slower than using the WLAN or Bluetooth. As long as the user has a prearranged subscription to the hot spots, the user of the mobile terminal such as the laptop, the mobile phone or PDA may access the internet with a relatively high communication speed. Accordingly, the mobile terminal using WLAN may provide the user with cheaper cost for data and/or voice communication and faster, higher data rate than the regular mobile terminal using the mobile telecommunications networks. A Voice-Over-Internet-Protocol (VOIP) can be one of most popular application for the mobile with WLAN feature.

However, the VOIP on the mobile terminal may have several shortcomings. First, because the WLAN is usually specified for a personal computer and does not usually require a handover, the mobile terminal with the WLAN/Bluetooth feature may experience when used for VOIP. If a user of the mobile terminal moves outside the coverage area of the WLAN hotspot, any call made by the VOIP can lose the connection due to a lack of handover from the WLAN to other wireless network, such as mobile telecommunications network. Conversely, the general mobile telecommunications network, such as GSM/GPRS/UMTS, has been optimized for the handover and power consumption thereof.

Currently, the solution for the mobile terminal to recognize if it is at or near a WLAN cell or hotspot is to detect the entire band periodically. As the mobile terminal may have to constantly check if it is within the hot spot using its radio transceiver, the power consumption of the mobile terminal may substantially increase. Since the most mobile terminals are battery-powered, the reduction of the battery life can undercut the effectiveness of the true mobility of the mobile terminal. If the user does not want the mobile terminal to automatically scan the WLAN cell or coverage area, the user may have to manually select the WLAN communication when he or she needs it. With this strategy, the use of the WLAN capable mobile terminal is not automatic and not user-friendly.

SUMMARY OF THE INVENTION

One aspect of the present invention pertains to the recognition by the present inventors about the background art problems explained above. Namely, it would be advantageous to implement a strategy to optimize the power consumption of the mobile terminal when the mobile terminal accessing the WLAN. One exemplary embodiment of the present invention allows the mobile terminal to only scan the WLAN access point when it is at or near the WLAN cell and only the channel used by the cell.

An exemplary embodiment of the present invention provides a method comprising: when detected to be at or near a first wireless network service area, receiving information related to the first wireless network service area from a second wireless network; activating a first wireless network module based upon the received information and a user setting; detecting a first wireless network with the first wireless network module and the received information; and establishing a connection upon the detecting, wherein a communication between the mobile terminal and the first wireless network or second wireless network is performed via at least one access points.

As embodied and broadly described herein, there is provided a method of searching a wireless network, comprising: detecting a mobile device to be at or near a first wireless network service area; based upon the detecting, sending information related to a first wireless network to the mobile device via a second wireless network; establishing a connection between the mobile device and the first wireless network if the first wireless network is detected by a first wireless network module of the mobile device based upon the sent information and a user setting of the mobile device. The method can further comprise receiving a notification message from the mobile device via the second wireless network if the first wireless network is not detected, receiving a message from the mobile device via the first or second wireless network if the first wireless network module is detected by the first wireless network module, wherein the first wireless network comprises one of a Wireless Local Area Network (WLAN) and Wireless Personal Area Network (WPAN) and the second wireless network comprises a telecommunications network.

In accordance with the present invention, the present invention provides a mobile terminal capable of selecting a wireless network, the terminal comprising: a first wireless network module configured to establish a link with a first wireless network; a second wireless network module configured to establish a link with a second network; a controller cooperating with the first wireless network module and the second wireless network module such that the mobile terminal is configured to receive the information related to the first wireless network from the second wireless network; to enable the first wireless network module based upon the received information and a user setting; and to detect the first wireless network with the first wireless network module and the received information, wherein a connection is established between the mobile terminal and the first wireless network if the first wireless network module detects the first wireless network

BRIEF DESCRIPTION OF THE DRAWINGS

The present invention will be described by the accompanying drawings that illustrate various exemplary embodiments. The illustrated embodiments are simply examples of the present invention and do not limit the scope thereof.

DETAILED DESCRIPTION

As an overview, it is desirable to optimize the power consumption of the mobile communications terminal using a WLAN module.

Figure 1:
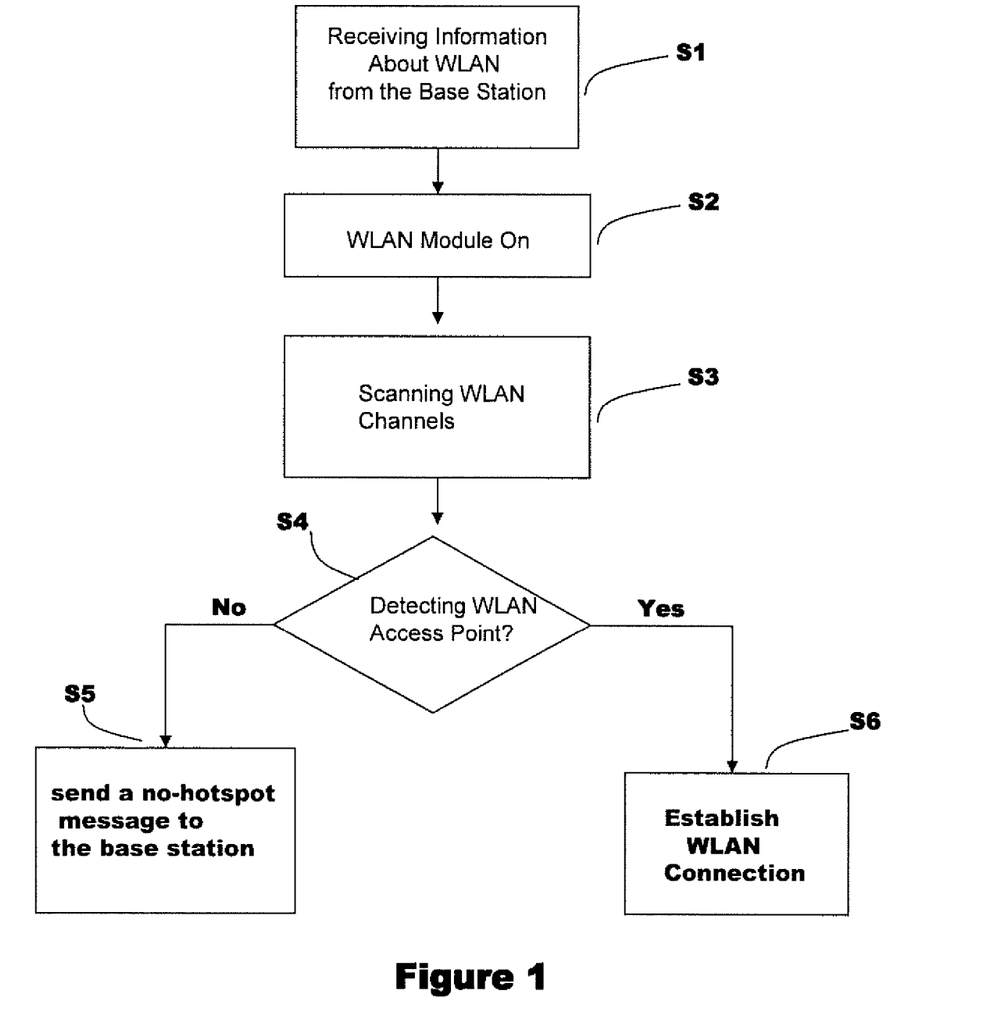
FIG. 1 is an exemplary flowchart showing a method of detecting WLAN for a mobile terminal according to the present invention.

Referring now to the accompanying drawings, FIG. 1 depicts an exemplary flowchart showing a method of detecting a WLAN for a mobile terminal according to the present invention, Here, the WLAN can comprise a Wireless Fidelity (WI-FI), Wi-Max™, Wi-Bro™ and Brew™. It is clear that other types of WLAN or similar operations may also be supported by the features of the present invention. A method of searching a wireless network for a mobile terminal, in the step S1, a base station can send information with respect to a first wireless network from a base station via a second wireless network, a mobile telecommunications network such as 2G, 3G and subsequent network technology, and the mobile communications terminal can receive the information. The base station can be configured to detect whether the mobile terminal is within a service area of the WLAN via a Global Positioning Service (GPS). Then, the base station can send the access point information to the mobile terminal if the mobile terminal is within a service area of the WLAN when the mobile terminal is configured to operate in the second wireless network or the mobile telecommunications network. At least one of the mobile terminal and the base station can be configured to store a list of all the known hotspots compatible to the mobile terminal.

The first wireless network may comprise one of a Wireless Local Area Network (WLAN) and Wireless Personal Area Network (WPAN). The information can further include at least one of a presence of Wireless Fidelity (WIFI) cells, Bluetooth™ cells, World Interoperability for Microwave Access (WIMAX) cells, and Wireless Broadband (WIBRO) cells, and Binary Runtime Environment for Wireless (BREW) cells. In addition, the information about the first wireless network may comprise one of: a type of the access point, a profile of the access point, a power class of the first wireless network, and a type of the first wireless network channels, and the mobile terminal can receive the information via at least one of a short message service (SMS), multimedia message service (MMS), e-mail, voice mail, General Packet Radio Service (GPRS), Enhanced General Packet Radio Service (EDGE) and High-Speed Downlink Packet Access (HSDPA).

In the step S2, a WLAN module in the mobile terminal can be enabled upon receiving the information. Then the mobile terminal can scan the WLAN channels via the WLAN module (step S3). In the step S4, the mobile terminal determines whether an access point of the WLAN is detected. The mobile terminal can send a notification message to the base station via the mobile telecommunications network if an access point of the first wireless network is not detected (step S5) and establish the WLAN connection between the mobile terminal and the access point if the WLAN module detects the access point (step S6). Further, the mobile terminal can send a message to the base station via the WLAN or the mobile telecommunications network if the WLAN module detects the access point.

In addition, the method can be described such that a method for a mobile terminal to connect with a wireless network, may comprise: when detected to be at or near a first wireless network service area (or access point, hotspot, and so forth), receiving information related to the first wireless network service area from a second wireless network, a base station; activating a first wireless network module based upon the received information and a user setting; detecting a first wireless network with the first wireless network module and the received information; and establishing a connection upon the detecting, wherein a communication between the mobile terminal and the first wireless network or second wireless network is performed via at least one access points. If the mobile terminal is out of a range of the WLAN access point and moves into the second wireless network, the mobile terminal may disable the WLAN module.

The detailed description regarding how the mobile terminal detects the hotspot or access point can be shown in the drawings of FIGS. 2-5.

FIGS. 2-5 illustrate an exemplary operational flow of detecting a wireless network in a wireless communications system according to the present invention.

Figure 2:
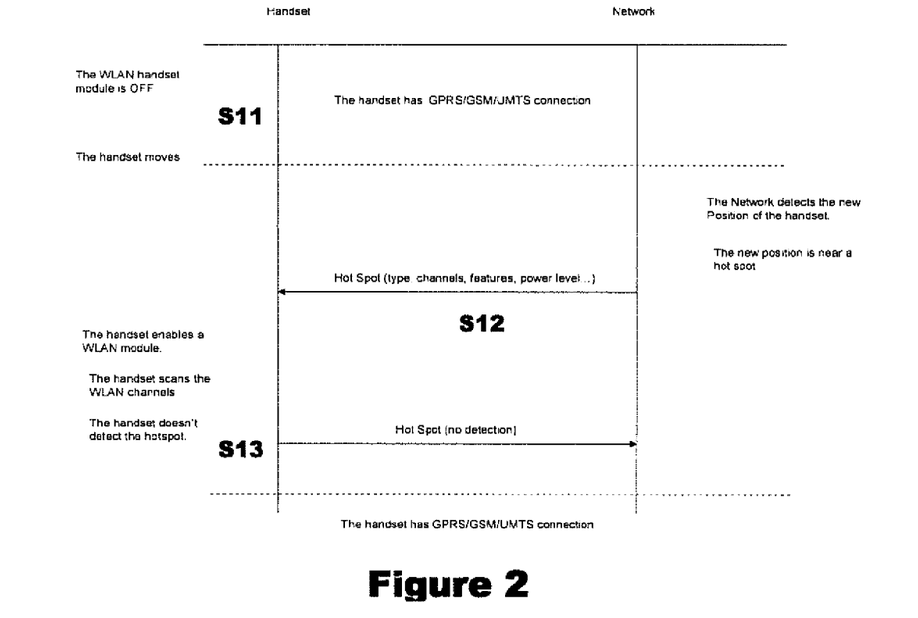
FIGS. 2-5 show an exemplary operational flow of detecting g a wireless network in a wireless communications system according to the present invention.

Referring to FIG. 2, the WLAN module in the mobile terminal can be initially turned off while the terminal has the general mobile telecommunications network connection such as GPRS/GSM/UMTS (step S11). When the terminal or handset moves near an access point of WLAN, the network can detect a new location of the mobile terminal and determine that the new location is near the access point. In the step S12, the base station can send information regarding the access point or hotspot to the mobile terminal. The information can include a type of hotspot, channel information of the WLAN hotspot, profile of the hot spot, channels used for the hotspot, power class and level of the hotspot, and various other feature of the hotspot. All these information can enable the mobile terminal to optimize or speed up the search of the hot spot.

Figure 6:
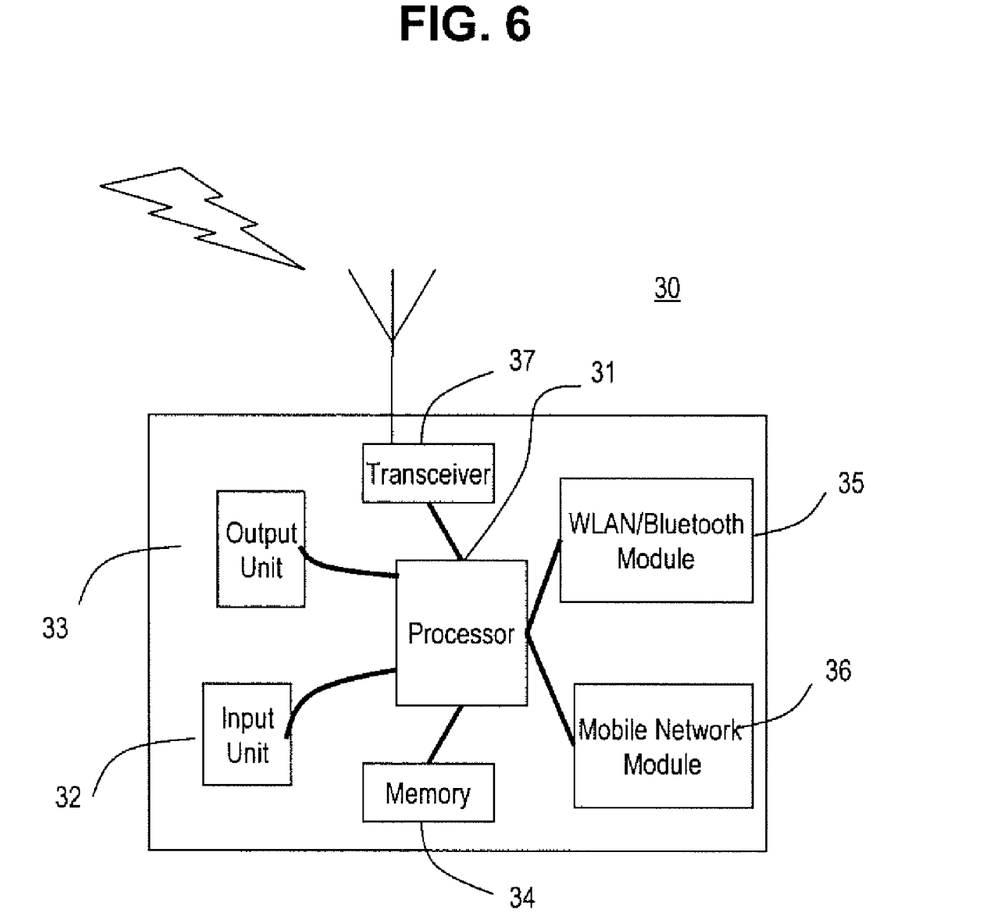
FIG. 6 is an explanatory diagram of the mobile communications terminal including the wireless network modules according to the present invention

Upon receiving the relevant information and a user setting of the terminal, the mobile terminal can activate the WLAN module to detect the nearest hotspot among the multiple hotspots by using several methods. First, the base station can provide information including the hotspot with the shortest distance from the mobile terminal. Also, the WLAN nodule can detect the hotspot generating the strongest signal. As illustrated in FIG. 6, the WLAN module may include a Bluetooth module and the Bluetooth module can be used to detect the closest hotspot. When the access point or hotspot can handle both the WLAN and Bluetooth, the mobile terminal can detect the closest access point if the Bluetooth module of the terminal can detect a Bluetooth access point therein.

Since FIG. 2 illustrates the mobile terminal not detecting the hotspot, the mobile terminal fails to detect the hotspot and may send a message to the base station or network via the mobile telecommunications network if the WLAN module does not detect the hotspot (step S13).

Figure 3:
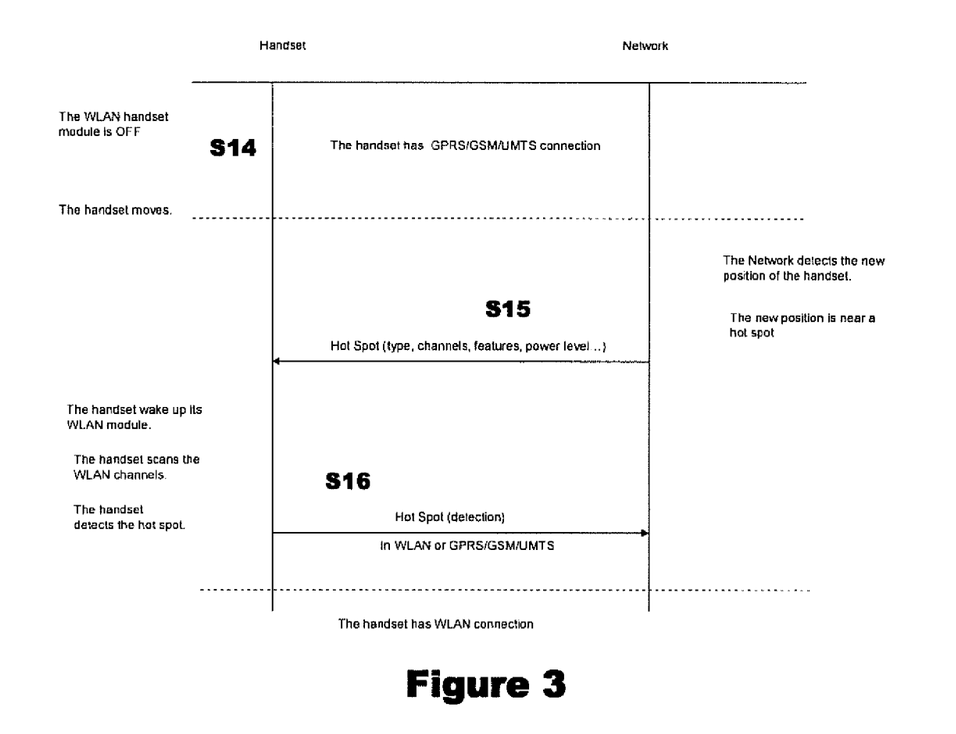

FIG. 3 shows an exemplary operational flow of detecting a wireless network in a wireless communications system according to the present invention if the WLAN module detects the WLAN hotspot.

The detailed explanation of steps S14-15 can be referred to the previously described steps S11-12 in FIG. 2 because the steps S14-S15 can be substantially similar to the steps S11-

S12 in FIG. 2. Accordingly, the detailed explanation of steps S14-S15 may not be repeated.

If the WLAN module detects the hotspot, the mobile terminal can send a message to the base station via the WLAN or the mobile telecommunications network (step S16). The message can be delivered to the base station by sending the message from the mobile terminal to the hotspot and the message can be further delivered from the hotspot to the base station via the public switched telephone network (PSTN) or other known network connection.

Figure 4:
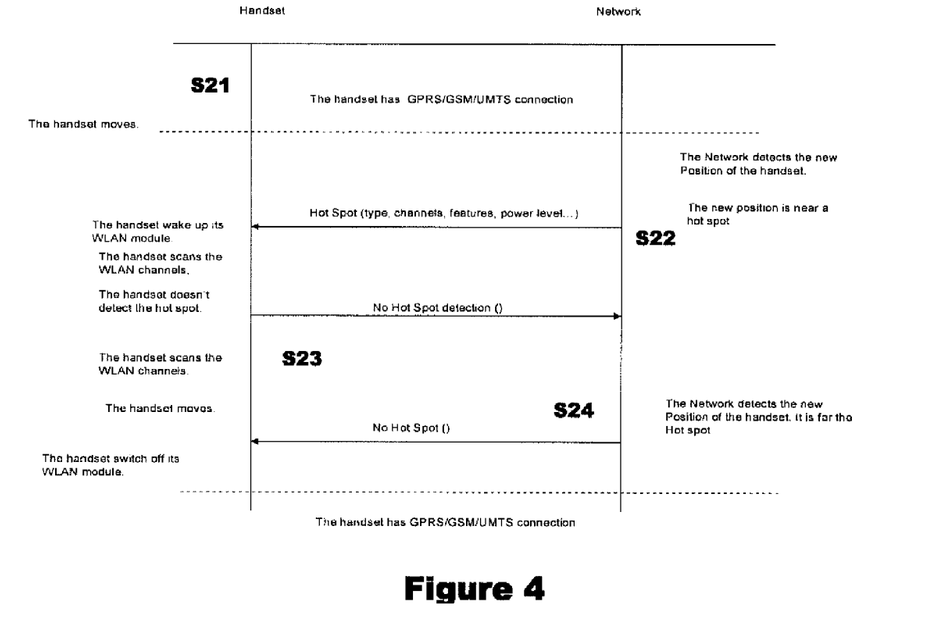

FIG. 4 shows another exemplary operational flow of detecting a wireless network in a wireless communications system according to the present invention if the WLAN module does not detect the WLAN hotspot.

The detailed explanation of steps S21-23 can be referred to the previously described steps S11-13 in FIG. 2 because the steps S21-S23 can be substantially similar to the steps S11-S13 in FIG. 2. Accordingly, the detailed explanation of steps S21-S23 may not be repeated. Upon receiving the no-detection message from the mobile terminal, the base station can determine that the new position of the mobile terminal is too far from the coverage area of the hotspot and further send an additional message to the mobile terminal via the second wireless network or the mobile telecommunications network, wherein the additional message can inform the mobile terminal that there is no hotspot in the vicinity of the mobile terminal currently (step S24). This message can be sent to the mobile terminal via at least one of a short message service (SMS), multimedia message service (MMS), e-mail, voice mail, General Packet Radio Service (GPRS), Enhanced General Packet Radio Service (EDGE) and High-Speed Downlink Packet Access (HSDPA) as described earlier. Upon receiving the no-hotspot message from the network or base station, the mobile terminal can deactivate the WLAN module.

Figure 5:
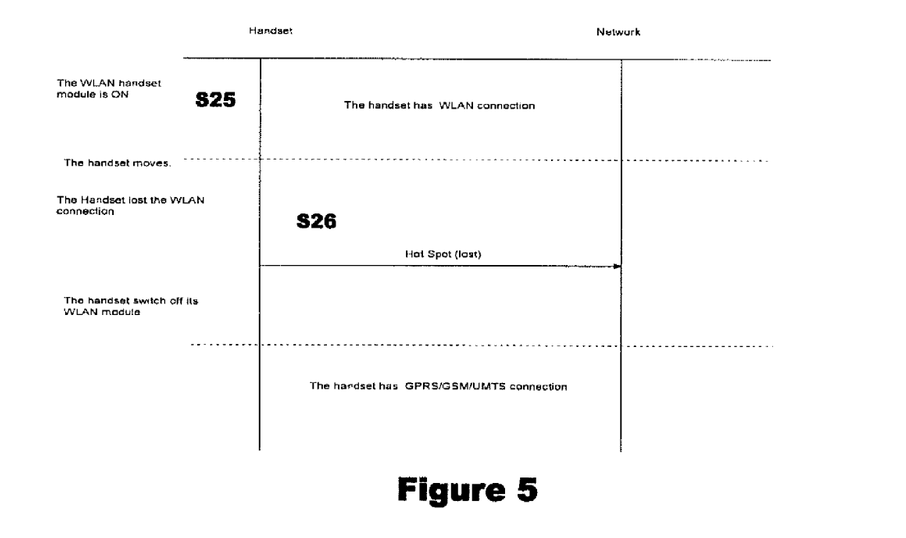

FIG. 5 shows another exemplary operational flow of disconnecting the WLAN according to the present invention. Here, the WLAN module is activated and there is the WLAN connection between the mobile terminal and the hotspot. As illustrated in FIG. 3, the mobile terminal detects the hotspot and has the WLAN connection. A user of the mobile terminal can move freely within the service area of hotspot thanks to the wireless advantage. However, if the user moves too far from the hotspot, the WLAN connection between the mobile terminal and the hotspot can be lost. After several attempts to scan the hotspot, the mobile terminal may deactivate the WLAN module to disconnect the WLAN service if it is determined that 1) the power consumption surpasses a threshold level to establish the WLAN connection 2) a quality of service (QoS) drops below the minimum quality and other conditions. Then the mobile terminal can send the message to base station to inform the WLAN disconnection via the mobile telecommunications network (step S26).

FIG. 6 is an explanatory diagram of the mobile communications terminal including the wireless network modules according to the present invention. Referring to FIG. 6, a mobile communication terminal 30 can comprise a first wireless network, WLAN/Bluetooth, module 35 configured to establish a network connection with an access point; a second wireless network, mobile communication network, module 36 configured to establish a network connection with a base station; a controller or processor 31 cooperating with the first wireless network module and the second wireless network module such that the mobile terminal is configured to receive the information related to the first wireless network from the second wireless network; to enable the first wireless network module based upon the received information and a user setting; and to detect the first wireless network with the first wireless network module and the received information. Accordingly a network connection is established between the mobile terminal and the first wireless network if the first wireless network module detects the first wireless network The mobile terminal can further comprise a memory or storage device 34 to store information with respect to the WIFI/Bluetooth module 35 and the mobile telecommunications network module 36, an input unit 32, an output unit 33 to display data, and a transceiver 37 in communication with the base station 26. The storage device can be configured to store at least one of: first information of a wireless network environment, the information configured to be updated by the base station; and second information with respect to a setting of the first and second wireless modules. The first information may comprise an availability of at least one of the first and second wireless networks, and the second information may comprise a selection of one of the first and second wireless networks corresponding to one of a data service and a voice call service.

The output unit 33 can display a user interface capable of one of: allowing the first wireless network module 35 to be enabled without informing the user thereof if the user setting is set for an automatic mode; and allowing a user to determine whether to enable the first wireless network module 35 if the user setting is set for a manual mode. Here, if the user setting is set for the automatic mode, a seamless handover is performed when the mobile terminal moves between the first wireless network, WLAN, and the second wireless network, mobile communication network. Further, the input unit 32 can allow the user to select at least one of the first and second wireless network modules 35, 36 to access a wireless network. It is noted that the mobile terminal can be configured to perform a communication via a Voice-Over-Internet-Protocol (VOIP) in the first or second wireless network.

As described above, the mobile terminal used for Unlicensed Mobile Access (UMA) or for converge solution can comprise the mobile telecommunications network module 36 (such as GSM/GPRS/UMTS) and the WIFI/Bluetooth module 35. Recently, the mobile terminal or handset using the mobile telecommunications network has been well developed to optimize power consumption feature. The handset knows when it must do a handover while moving from one cell to another one. This feature is already specified in the known telecommunications standard. Meanwhile, the WIFI (or WLAN) is specified for PC applications without handover feature. As described above, an exemplary embodiment of the present invention can provide a seamless handover when the mobile terminal moves between the WLAN and the telecommunications network.

In accordance with an exemplary embodiment of the present invention, a user of the mobile communications terminal can be allowed to access the wireless network by manually selecting one of the WLAN or WPAN and the telecommunications network or automatically as described above. The mobile communications terminal can further include a graphical user interface allowing the user to manually select which wireless network module to access the wireless network or a dedicated input unit (such as a hotkey arranged on a body of the mobile terminal) to realize the same goal.

The exemplary embodiment of the present invention provides a method for a mobile terminal to connect with a wireless network, comprising: when detected to be at or near a first wireless network service area, receiving information related to the first wireless network service area from a second wireless network; activating a first wireless network module based upon the received information and a user setting; detecting a first wireless network with the first wireless network module and the received information; and establishing a connection upon the detecting, wherein a communication between the mobile terminal and the first wireless network or second wireless network is performed via at least one access points.

The method further comprises: sending a message to the second wireless network via one of the first wireless network and the second wireless network if the first wireless network module detects the first wireless network; and sending a notification message to the second wireless network via the second wireless network if the first wireless network module does not detect the second wireless network, wherein the first wireless network comprises one of a Wireless Local Area Network (WLAN) and Wireless Personal Area Network (WPAN) and the second wireless network comprises a telecommunications network, wherein the information further comprises at least one of a presence of Wireless Fidelity (WIFI) cells, Bluetooth™ cells, World Interoperability for Microwave Access (WIMAX) cells, and Wireless Broadband (WIBRO) cells, and Binary Runtime Environment for Wireless (BREW) cells, wherein the information with respect to the first wireless network comprises one of: a type of the access point, a profile of the access point, a power class of the first wireless network, and a type of the first wireless network channels, and wherein the mobile terminal receives the information via at least one of a short message service (SMS), multimedia message service (MMS), e-mail, voice mail, General Packet Radio Service (GPRS), Enhanced General Packet Radio Service (EDGE) and High-Speed Downlink Packet Access (HSDPA).

Furthermore, the method may comprise: disabling the first wireless network module when out of a range of the first wireless network service area and moved into the second wireless network, wherein the second wireless network is configured to detect whether the mobile terminal is within the first wireless network service area via a Global Positioning Service (GPS), wherein the second wireless network is configured to send the access point information to the mobile terminal by broadcasting the information to a plurality of mobile terminals located near the service area or multicasting the information to each mobile terminal.

The method may further comprise: allowing the first wireless network module to be enabled without informing a user thereof if the user setting is set for an automatic mode; or allowing a user to determine whether to enable the first wireless network module if the user setting is set for a manual mode. The method comprises: if the user setting is set for the automatic mode, performing a seamless handover when the mobile terminal moves between the first wireless network and the second wireless network.

In accordance with an exemplary embodiment of the present invention, there is provided a method of searching a wireless network, comprising: detecting a mobile device to be at or near a first wireless network service area; based upon the detecting, sending information related to a first wireless network to the mobile device via a second wireless network; establishing a connection between the mobile device and the first wireless network if the first wireless network is detected by a first wireless network module of the mobile device based upon the sent information and a user setting of the mobile device. The method can further comprise receiving a notification message from the mobile device via the second wireless network if the first wireless network is not detected, receiving a message from the mobile device via the first or second wireless network if the first wireless network module is detected by the first wireless network module, wherein the first wireless network comprises one of a Wireless Local Area Network (WLAN) and Wireless Personal Area Network (WPAN) and the second wireless network comprises a telecommunications network.

The exemplary embodiment of the present invention provides a mobile terminal capable of selecting a wireless network, the terminal comprising: a first wireless network module configured to establish a link with a first wireless network; a second wireless network module configured to establish a link with a second network; a controller cooperating with the first wireless network module and the second wireless network module such that the mobile terminal is configured to receive the information related to the first wireless network from the second wireless network; to enable the first wireless network module based upon the received information and a user setting; and to detect the first wireless network with the first wireless network module and the received information, wherein a connection is established between the mobile terminal and the first wireless network if the first wireless network module detects the first wireless network, wherein the first wireless network comprises one of a Wireless Local Area Network (WLAN) and Wireless Personal Area Network (WPAN) and the second wireless network comprises a telecommunications network, wherein the information of the first wireless network comprises one of: a type of the access point, a profile of the access point, a power class of the first wireless network, and a type of the first wireless network channels, and wherein the mobile terminal is configured to receive the information via at least one of a short message service (SMS), multimedia message service (MMS), e-mail, voice mail, General Packet Radio Service (GPRS), Enhanced General Packet Radio Service (EDGE) and High-Speed Downlink Packet Access (HSDPA).

The terminal may further comprise a storage device to store at least one of: first information of a wireless network environment, the information configured to be updated by the second wireless network; and second information related to a user setting of the first and second wireless network modules, wherein the first information comprises an availability of at least one of the first and second wireless networks, and wherein the second information comprises a selection of one of the first and second wireless networks corresponding to one of a data service and a voice call service.

The terminal further comprises a display screen showing a user interface capable of one of: allowing the first wireless network module to be enabled without informing the user thereof if the user setting is set for an automatic mode; and allowing a user to determine whether to enable the first wireless network module if the user setting is set for a manual mode, wherein if the user setting is set for the automatic mode, a seamless handover is performed when the mobile terminal moves between the first wireless network and the second wireless network.

In addition, the terminal may comprise comprising an input unit allowing the user to select at least one of the first and second wireless network modules to access a wireless network, wherein the mobile terminal is configured to perform a communication via a Voice-Over-Internet-Protocol (VOIP) in the first or second wireless network.

As related to wireless networks, this invention is related to the telecommunication area, however, the solution may also cover the possible other uses of the employment of both Bluetooth and WLAN protocols out of this area. As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for a mobile terminal having at least two different types of wireless network modules to connect with a wireless network, the method comprising:
    entering or approaching a first wireless network service area;
    receiving information related to the first wireless network service area from a second wireless network when the second wireless network detects that the mobile terminal is at or near the first wireless network service area even when no request is sent to the second wireless network for the information related to the first wireless network service area, the information including the first wireless network service area that is nearest from the mobile terminal;
    activating a first wireless network module based upon the received information and a user setting after receiving the information related to the first wireless network service from the second wireless network, wherein the first wireless network module is initially turned off or inactive in a second wireless network service area before the information related to the first wireless network service area is received from the second wireless network, and wherein activating the first wireless network module comprises:
        allowing the first wireless network module to be activated in response to the information without informing a user if the user setting is set for an automatic mode; and
        allowing the user to determine whether to activate the first wireless network module by displaying a user interface if the user setting is set for a manual mode;
    scanning for a wireless network available only within the first wireless network service area with the activated first wireless network module based upon the information related to the first wireless network service received from the second wireless network;
    detecting a first wireless network that generates a strongest signal within the first wireless network service area with the activated first wireless network module and the received information;
    establishing a connection with the first wireless network upon detecting the first wireless network;
    scanning the first wireless network for a predetermined number of times when the mobile terminal moves away from the first wireless network service area after the connection with the first wireless network has been established such that the first wireless network is no longer scanned after the first wireless network is scanned for the predetermined number of times even if the first wireless network is not detected;
    determining that power consumption surpasses a threshold level to establish the first wireless network connection or that quality of service drops below a minimum quality;
    deactivating the first wireless network module after determining that the power consumption has surpassed the threshold level or that the quality of service has dropped below the minimum quality; and
    sending a message to the second wireless network, the message informing that the mobile terminal has been disconnected from the first wireless network,
    wherein a second wireless network module, which establishes a connection with the second wireless network, is also active when the connection between the first wireless network module and the first wireless network is established in the first wireless network service area,
    wherein the information with respect to the first wireless network comprises at least a type of at least one access point, a profile of the at least one access point, a power class of the first wireless network, or a type of first wireless network channels.

2. The method of claim 1, wherein a communication between the mobile terminal and the first wireless network is performed via the at least one access point.

3. The method of claim 1, further comprising:
    sending a message to the second wireless network via the first wireless network or the second wireless network if the first wireless network module detects the first wireless network, the message indicating that the first wireless network has been detected; and
    sending a notification message to the second wireless network via the second wireless network if the first wireless network module does not detect the first wireless network, the notification message indicating that the first wireless network is not detected.

4. The method of claim 3, wherein the first wireless network comprises a Wireless Local Area Network (WLAN) or a Wireless Personal Area Network (WPAN) and the second wireless network comprises a telecommunications network.

5. The method of claim 4, wherein the information further comprises presence of at least Wireless Fidelity (WIFI) cells, Bluetooth™ cells, World Interoperability for Microwave Access (WIMAX) cells, and Wireless Broadband (WIBRO) cells, or Binary Runtime Environment for Wireless (BREW) cells.

6. The method of claim 4, wherein the mobile terminal receives the information via at least a short message service (SMS), multimedia message service (MMS), e-mail, voice mail, General Packet Radio Service (GPRS), Enhanced General Packet Radio Service (EDGE) or High-Speed Downlink Packet Access (HSDPA).

7. The method of claim 4, wherein the first wireless network module comprises a Wireless Local Area Network (WLAN) module and a Bluetooth module, and when the at least one access point can handle both the WLAN and Bluetooth, the Bluetooth module detects a Bluetooth access point.

8. The method of claim 1, further comprising:
    disabling the first wireless network module when the mobile terminal is out of a range of the first wireless network service area.

9. The method of claim 1, wherein the second wireless network is configured to detect a position of the mobile terminal via a Global Positioning Service (GPS).

10. The method of claim 1, wherein the second wireless network is configured to send access point information to the mobile terminal by broadcasting the information to a plurality of mobile terminals located near the first network service area or multicasting the information to each of the plurality of mobile terminals.

11. The method of claim 1, further comprising:
    performing a seamless handover when the mobile terminal moves between the first wireless network and the second wireless network if the user setting is set for the automatic mode.

12. The method of claim 3, further comprising:
    receiving an additional message from the second wireless network, wherein the second wireless network sends the additional message to the mobile terminal in response to the notification message received from the mobile terminal after determining that a current position of the mobile terminal is out of a coverage area of the first wireless network service area, the additional message informing that there is no first wireless network service area in the vicinity of the current position of the mobile terminal.

13. A method of searching a wireless network, the method comprising:
- detecting that a mobile device, having at least two different types of wireless network modules, is located at or near a first wireless network service area;
- sending information related to a first wireless network to the mobile device via a second wireless network upon detecting the mobile device at or near the first wireless network area even in the absence of a request for the information, the information including the first wireless network service area that is nearest from the mobile terminal;
- scanning, by a first wireless network module of the mobile device, for the first wireless network that is available only within the first wireless network service area, based upon the information related to the first wireless network;
- establishing a connection between the mobile device and the first wireless network via the first wireless network module of the mobile device based upon the information and a user setting of the mobile device; and
- receiving a notification message from the mobile device via the second wireless network if the first wireless network is not detected by the first wireless network module the notification message indicating that the first wireless network is not detected and the connection was not established; and
- receiving a message from the mobile device via the first or second wireless network if the first wireless network module is detected by the first wireless network module, the message indicating that the first wireless network has been detected and the connection has been established, wherein, before the scanning, the mobile device is configured to:
- activate the first wireless network module based upon the information related to the first wireless network and the user setting after receiving the information related to the first wireless network service from the second wireless network, wherein the first wireless network module is initially turned off or inactive in a second wireless network service area before the information related to the first wireless network is received from the second wireless network, and wherein activating the first wireless network module comprises:
  - allowing the first wireless network module to be activated in response to the information without informing a user of the mobile device if the user setting is set for an automatic mode; and
  - allowing the user to determine whether to activate the first wireless network module by displaying a user interface if the user setting is set for a manual mode;
- scan the first wireless network for a predetermined number of times when the mobile terminal moves away from the first wireless network service area after the connection with the first wireless network has been established such that the first wireless network is no longer scanned after the first wireless network is scanned for the predetermined number of times even if the first wireless network is not detected;
- determine that power consumption surpasses a threshold level to establish the first wireless network connection or that quality of service drops below a minimum quality;
- deactivate the first wireless network module after determining that the power consumption has surpassed the threshold level or that the quality of service has dropped below the minimum quality; and
- send a message to the second wireless network, the message informing that the mobile device has been disconnected from the first wireless network, wherein more than one of the at least two different types of wireless network modules are configured to be activated at the first wireless network area based upon the user setting even when the connection between the mobile device and the first wireless network has been established via the first wireless network module, wherein the information with respect to the first wireless network comprises at least a type of at least one access point, a profile of the at least one access point, a power class of the first wireless network, or a type of first wireless network channels, and wherein the mobile device receives the information via at least a short message service (SMS), multimedia message service (MMS), e-mail, voice mail, General Packet Radio Service (GPRS), Enhanced General Packet Radio Service (EDGE) or High-Speed Downlink Packet Access (HSDPA).

14. The method of claim 13, wherein the first wireless network comprises one of a Wireless Local Area Network (WLAN) and a Wireless Personal Area Network (WPAN) and the second wireless network comprises a telecommunications network.

15. The method of claim 14, wherein the first wireless network module comprises a Wireless Local Area Network (WLAN) module and a Bluetooth module, and when the at least one access point can handle both the WLAN and Bluetooth, the Bluetooth module detects a Bluetooth access point.

16. The method of claim 13, wherein the mobile device is further configured to receive an additional message from the second wireless network, wherein the second wireless network sends the additional message to the mobile device in response to the notification message received from the mobile device after determining that a current position of the mobile device is out of a coverage area of the first wireless network service area, the additional message informing that there is no first wireless network service area in the vicinity of the current position of the mobile device.

17. A mobile terminal capable of selecting a wireless network, the terminal comprising:
- a first wireless network module configured to establish a link with a first wireless network;
- a second wireless network module configured to establish a link with a second network and receive information related to the first wireless network from the second network when the second wireless network detects that the mobile terminal is at or near a first wireless network service area even when no request is sent from the mobile terminal to the second wireless network for the information related to the first wireless network, the information including a first wireless network service area that is nearest from the mobile terminal;
- an input unit configured to receive an input for selecting at least the first wireless network module or the second wireless network module to access the wireless network;
- a controller cooperating with the first wireless network module and the second wireless network module to enable the first wireless network module based upon the received information and a user setting, and to detect the first wireless network with the first wireless network module, wherein enabling the first wireless network module comprises:
  allowing the first wireless network module to be enabled in response to the information without informing a user if the user setting is set for an automatic mode; and
  allowing the user to determine whether to enable the first wireless network module by displaying a user interface if the user setting is set for a manual mode; and
a display screen displaying the user interface,
wherein a connection is established between the mobile terminal and the first wireless network upon detecting the first wireless network that generates a strongest signal within the first wireless network service area by the first wireless network module,
wherein the first wireless network module is further configured to scan the first wireless network for a predetermined number of times when the mobile terminal moves away from the first wireless network area after the connection with the first wireless network has been established such that the first wireless network is no longer scanned after the first wireless network is scanned for the predetermined number of times even if the first wireless network is not detected,
wherein the controller is further configured to determine that power consumption surpasses a threshold level to establish the first wireless network connection or that quality of service drops below a minimum quality,
wherein the controller is further configured to deactivate the first wireless network module after determining that the power consumption has surpassed the threshold level or that the quality of service has dropped below the minimum quality,
wherein the controller is further configured to send a message to the second wireless network, the message informing that the mobile terminal has been disconnected from the first wireless network,
wherein both the first wireless network module and the second wireless network module are enabled to establish a link with their respective networks in response to the input even when the connection is established between the mobile terminal and the first wireless network,
wherein the information related to the first wireless network comprises at least a type of at least one access point, a profile of the at least one access point, a power class of the first wireless network, or a type of first wireless network channels.

18. The terminal of claim 17, wherein the first wireless network comprises a Wireless Local Area Network (WLAN) or a Wireless Personal Area Network (WPAN) and the second wireless network comprises a telecommunications network.

19. The method of claim 18, wherein the first wireless network module comprises a Wireless Local Area Network (WLAN) module and a Bluetooth module, and when the at least one access point can handle both the WLAN and Bluetooth, the Bluetooth module detects a Bluetooth access point.

20. The terminal of claim 17, wherein the mobile terminal is configured to receive the information via at least a short message service (SMS), multimedia message service (MMS), e-mail, voice mail, General Packet Radio Service (GPRS), Enhanced General Packet Radio Service (EDGE) or High-Speed Downlink Packet Access (HSDPA).

21. The terminal of claim 17, further comprising a storage device to store at least:
  first information of a wireless network environment, the first information updated by the second wireless network; or
  second information related to the user setting for the first and second wireless network modules.

22. The terminal of claim 21, wherein the first information comprises an availability of at least one of the first and second wireless networks, and wherein the second information comprises a selection of one of the first and second wireless networks corresponding to one of a data service and a voice call service.

23. The terminal of claim 17, wherein if the user setting is set for the automatic mode, a seamless handover is performed when the mobile terminal moves between the first wireless network and the second wireless network.

24. The terminal of claim 17, wherein the mobile terminal is configured to perform a communication via a Voice-Over-Internet-Protocol (VOIP) in the first or second wireless network.

25. The terminal of claim 17, wherein the input unit comprises a dedicated input unit or a hotkey configured to receive an input for manually selecting the first or second wireless network module.

26. The terminal of claim 17, wherein the controller is further configured to receive an additional message from the second wireless network, wherein the second wireless network sends the additional message to the mobile terminal in response to the notification message received from the mobile terminal after determining that a current position of the mobile terminal is out of a coverage area of the first wireless network service area, the additional message informing that there is no first wireless network service area in the vicinity of the current position of the mobile terminal.

* * * * *